(12) United States Patent
Nam et al.

(10) Patent No.: US 12,642,388 B2
(45) Date of Patent: Jun. 2, 2026

(54) ROTARY ROASTER HEATED BY INDUCTION HEATING METHOD

(71) Applicant: LG ELECTRONICS INC., Seoul (KR)

(72) Inventors: Hyeunsik Nam, Seoul (KR); Dooyong Oh, Seoul (KR); Hyunwook Moon, Seoul (KR); Yangkyeong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 855 days.

(21) Appl. No.: 17/914,637

(22) PCT Filed: Apr. 28, 2020

(86) PCT No.: PCT/KR2020/005613
§ 371 (c)(1),
(2) Date: Sep. 26, 2022

(87) PCT Pub. No.: WO2021/194006
PCT Pub. Date: Sep. 30, 2021

(65) Prior Publication Data
US 2023/0119105 A1    Apr. 20, 2023

(30) Foreign Application Priority Data

Mar. 27, 2020    (KR) ........................ 10-2020-0037648

(51) Int. Cl.
*A47J 37/04* (2006.01)
*F24C 7/06* (2006.01)
(Continued)

(52) U.S. Cl.
CPC ........... *A47J 37/047* (2013.01); *A47J 37/041* (2013.01); *F24C 7/067* (2013.01); *F24C 15/14* (2013.01);
(Continued)

(58) Field of Classification Search
CPC ....... A47J 37/041; A47J 37/047; H05B 11/00; H05B 6/1236; F24C 7/067; F24C 15/14; H02J 50/10
See application file for complete search history.

(56) References Cited

U.S. PATENT DOCUMENTS

2019/0170365 A1*    6/2019    Choi ....................... F24C 15/14

FOREIGN PATENT DOCUMENTS

JP        5-184471 A      7/1993
JP        2613816 B2      5/1997
(Continued)

OTHER PUBLICATIONS

Machine Translation of Asada et al (JP 1993184471), performed on Jul. 18, 2025 (Year: 1993).*
(Continued)

*Primary Examiner* — Brian W Jennison
(74) *Attorney, Agent, or Firm* — Birch, Stewart, Kolasch & Birch, LLP

(57)    ABSTRACT

The present disclosure relates to a rotary roaster capable of uniformly heating the entire surface of a grill by means of an induction heating method. According to one embodiment, a rotary roaster operating on an induction heating device comprises a supporter, a grill rotatably coupled to the supporter, a motor configured to rotate the grill and a receiving coil provided on a bottom surface of the supporter and configured to provide a power induced by a working coil of the induction heating device to the motor.

12 Claims, 14 Drawing Sheets

(51) Int. Cl.
   *F24C 15/14*      (2006.01)
   *H02J 50/10*      (2016.01)
   *H05B 6/12*       (2006.01)
   *H05B 11/00*      (2006.01)

(52) U.S. Cl.
   CPC ............ *H02J 50/10* (2016.02); *H05B 6/1236*
                   (2013.01); *H05B 11/00* (2013.01)

(56)                   References Cited

FOREIGN PATENT DOCUMENTS

| | | | |
|---|---|---|---|
| JP | 2000-135166 | A | 5/2000 |
| JP | 2005-278829 | A | 10/2005 |
| JP | 3814817 | B2 | 8/2006 |
| KR | 20-0462960 | Y1 | 10/2012 |
| KR | 10-1334076 | B1 | 11/2013 |
| KR | 10-1707043 | B1 | 2/2017 |
| KR | 10-1880865 | B1 | 7/2018 |

OTHER PUBLICATIONS

Machine Translation of Morihiro et al (JP 3814817 or JP2000135166), performed on Jul. 18, 2025 (Year: 2006).*
Machine Translation of Lee (KR 101707043), performed on Jul. 18, 2025 (Year: 2017).*

* cited by examiner

ROTARY ROASTER HEATED BY INDUCTION HEATING METHOD

CROSS REFERENCE TO RELATED APPLICATIONS

This application is the National Phase of PCT International Application No. PCT/KR2020/005613, filed on Apr. 28, 2020, which claims priority under 35 U.S.C. 119(a) to Patent Application No. 10-2020-0037648, filed in the Republic of Korea on Mar. 27, 2020, all of which are hereby expressly incorporated by reference into the present application.

TECHNICAL FIELD

The present disclosure relates to a rotary roaster in which a front surface of a grill may be uniformly heated by induction heating.

BACKGROUND ART

Recently, various cooking appliances using induction heating have been developing. In line with this, research on a method of heating food using a magnetic field rather than a method of heating food with a flame is actively being conducted.

Korean Patent Registration No. 10-1334076 hereinafter, referred to as 'Cited Document 1') discloses a roaster using induction heating. Hereinafter, the roaster disclosed in Cited Document 1 will be described in detail, referring to FIG. 1 (corresponding to FIG. 5 of Cited Document 1).

Referring to FIG. 1, a conventional roaster 2a includes an induction heating means 220, an upper plate 320 disposed on the induction heating means 330, and a roasting plate 400 coupled to the upper plate. The magnetic field generated in the induction heating means 330 may induce a current in the roasting plate 400, and the grill plate 400 may be heated by Joule's heat generated from the induced current.

However, when the area of the roasting plate 400 to be heated is wider than that of the induction heating means 330 as disclosed in Cited Document 1, there could be a problem of a lower heating uniformity, compared to when the roasting plate 400 is heated using a flame.

In particular, when heating the roasting plate 400 by using a flame like a gas burner, the burned heat passes around the roasting plate 400 and the heating uniformity of the roasting plate 400 could become high. Conversely, when heating the roasting plate 400 by using the magnetic field like the induction heating means 330, there could be a problem in that the temperature difference between the portion located above the induction heating means 330 and other portions of the roasting plate 400 is increasing, which results in lowering the heating uniformity of the roasting plate 400.

To overcome such limitations, Korean Patent Registration No. 10-1880865 (hereinafter, referred to as 'Cited Document 2') discloses a rotary roaster for improving the heating uniformity. Referring to FIG. 2 (corresponding to Cited Document 2), the rotary roaster disclosed in Cited Document 2 will be described in detail.

Referring to FIG. 2, the conventional rotary roaster 2b includes a crater hole 112', an oven 300' heated through the crater hole 112', and a controller 200' configured to control the oven 300'.

When a user operates the rotary roaster 2b after opening a lid 330' of the oven 300' and putting food in the oven 300', the controller 200' may rotate the oven 300' in a radial direction using a motor. Accordingly, a flame (i.e., a magnetic field) output from the crater hole 112' may be uniformly provided to an entire outer circumferential surface of the oven 300'. However, the oven 300' shown in Cited Document 2 has the structure configured to be selectively opened and closed. In this instance, it could be very inconvenient to add or remove some of the food put in the oven 300', and the steam generated during the cooking by the lid 330' could not be smoothly discharged. Accordingly, the food in the oven 300' might be steamed rather than roasted and there might be a limit to making the food with a crispy texture and taste.

In addition, Cited Document 2 requires electric power supplied to the motor in order to rotate the oven 300'. For that, the rotary roaster 2b should be wired to a separate commercial power source or use an embedded battery. However, if the rotary roaster 2b is wired to the commercial power source, there could be a problem of low portability. If the embedded battery is provided in the rotary roaster 2b, the battery should be replaced whenever it is discharged and then use convenience could be very low.

DESCRIPTION OF DISCLOSURE

Technical Problems

An object of the present disclosure is to provide a rotary roaster that may heat food in a grill, while rotating the grill.

Another object of the present disclosure is to provide a rotary roaster that may receive the oil discharged from the grill.

A further object of the present disclosure is to provide a rotary roaster that need not separate power source for rotating the grill.

A still further object of the present disclosure is to provide a rotary roaster that may allow the user to turn over or mix the food in the grill.

A still further object of the present disclosure is to provide a rotary roaster that may heat even a lateral surface of the grill by using induction heating.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

A rotary roaster according to an embodiment may include a grill disposed on a working coil of an induction heating device, and a motor configured to rotate the grill with respect to a shaft parallel to the working coil, thereby heating food in the grill while rotating the grill.

Further, a rotary roaster according to an embodiment may include an oil dripping pan under the entire range of movement of the outlet holes formed in the grill, thereby completely receiving the oil discharged from the grill.

Still further, a rotary roaster according to an embodiment may use the power induced by the working coil of the induction heating device to drive the motor, thereby requiring no separate power for rotating the grill.

Still further, a rotary roaster according to an embodiment may comprise a locking protrusion formed in the grill and control the rotation speed of the grill, thereby turning over or mixing the food in the grill.

Still further, a rotary roaster according to an embodiment may a lateral surface heating coil disposed to face an edge region of the grill and supply a current to the lateral surface heating coil, thereby heating even the lateral surface of the grill through the induction heating method.

ADVANTAGEOUS EFFECT

A rotary roaster according to an embodiment may heat the food in the grill while rotating the grill, thereby uniformly heating the food contained in a large area in the grill.

In addition, a rotary roaster according to an embodiment may completely receive the oil discharged from the grill, thereby preventing the oils of food during the cooking from splashing to the outside, and allow the user to easily dispose of the discharged oil.

In addition, a rotary roaster according to an embodiment may require no separate power for rotating the grill, thereby improving portability of the rotary roaster and use convenience.

In addition, a rotary roaster according to an embodiment may turn over or mix the food in the grill, thereby preventing certain part of the food from overheating or undercooking.

In addition, a rotary roaster according to an embodiment may heat even the lateral surface of the grill through the induction heating method, thereby uniformly heating the food regardless of the position in the grill.

[BRIEF DESCRIPTION OF DRAWINGS]

FIG. 3 is a view showing that a rotary roaster according to an embodiment of the present disclosure is placed on an induction heating device;

FIG. 6 is a view showing a grill according to an embodiment of the present disclosure;

DETAILED DESCRIPTION OF EXEMPLARY EMBODIMENT

Figure 1:
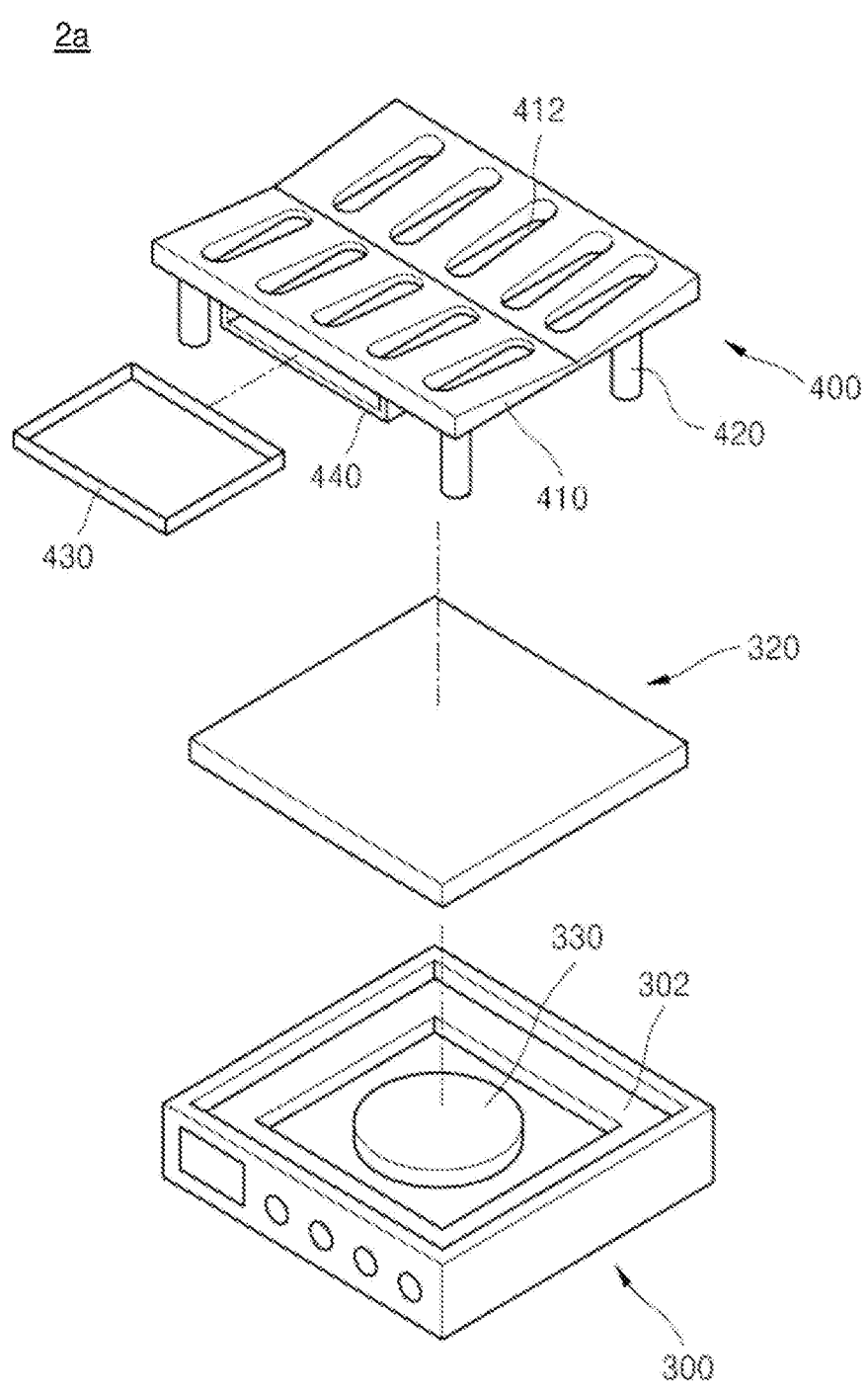
FIG. 1 is a view showing a conventional roaster heated by induction heating.

The above-described aspects, features and advantages are specifically described hereunder with reference to the accompanying drawings such that one having ordinary skill in the art to which the present disclosure pertains can easily implement the technical spirit of the disclosure. In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components should not be limited by the terms. Certainly, a first component can be a second component unless stated to the contrary.

Hereinafter, expressions of 'a component is provided or disposed in an upper or lower portion' may mean that the component is provided or disposed in contact with an upper surface or a lower surface. The present disclosure is not intended to limit that other elements are provided between the components and on the component or beneath the component.

It will be understood that although the terms first, second, A, B (a), (b), etc. may be used herein to describe various elements, these elements should not be limited by these terms. These terms are generally only used to distinguish one element from another. It will be understood that when an element is referred to as being "connected with" or "coupled to" another element, the element can be directly connected with the other element or intervening elements may also be present. In contrast, when an element is referred to as being "directly connected with" another element, there are no intervening elements present.

The singular forms "a", "an" and "the" are intended to include the plural forms as well, unless explicitly indicated otherwise. It should be further understood that the terms "comprise" or "include" and the like, set forth herein, are not interpreted as necessarily including all the stated components or steps but can be interpreted as excluding some of the stated components or steps or can be interpreted as including additional components or steps.

Figure 2:
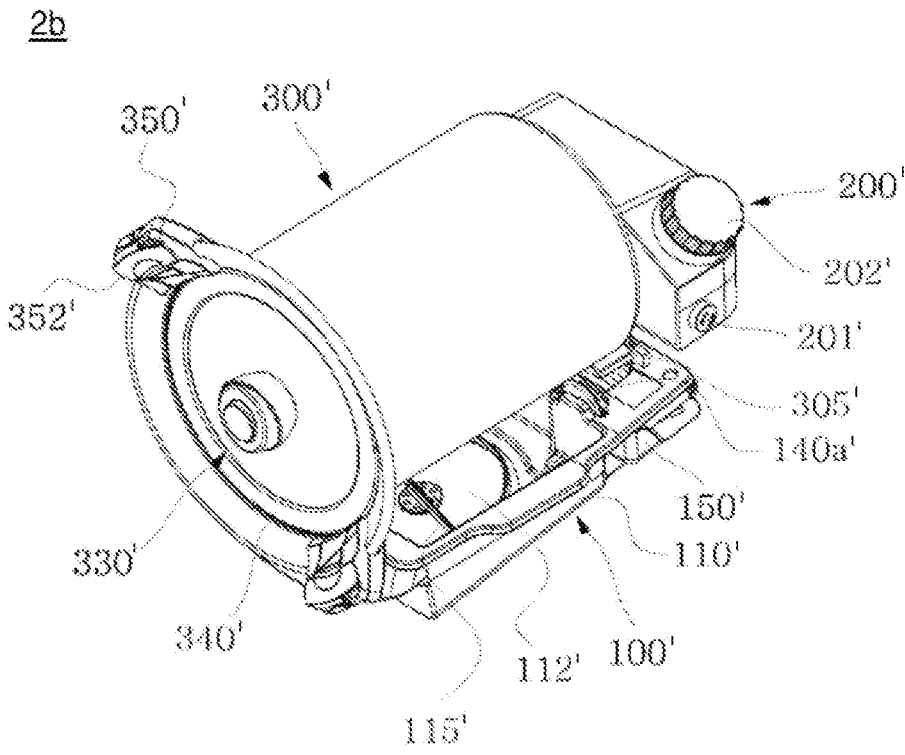
FIG. 2 is a view showing a conventional rotary roaster.

Embodiments of the present disclosure relate to a rotary roaster that may uniformly heat a front surface of a grill through induction heating. Hereinafter, referring to FIGS. 1 to 3, a rotary roaster according to an embodiment of the present disclosure will be described in detail.

Figure 3:
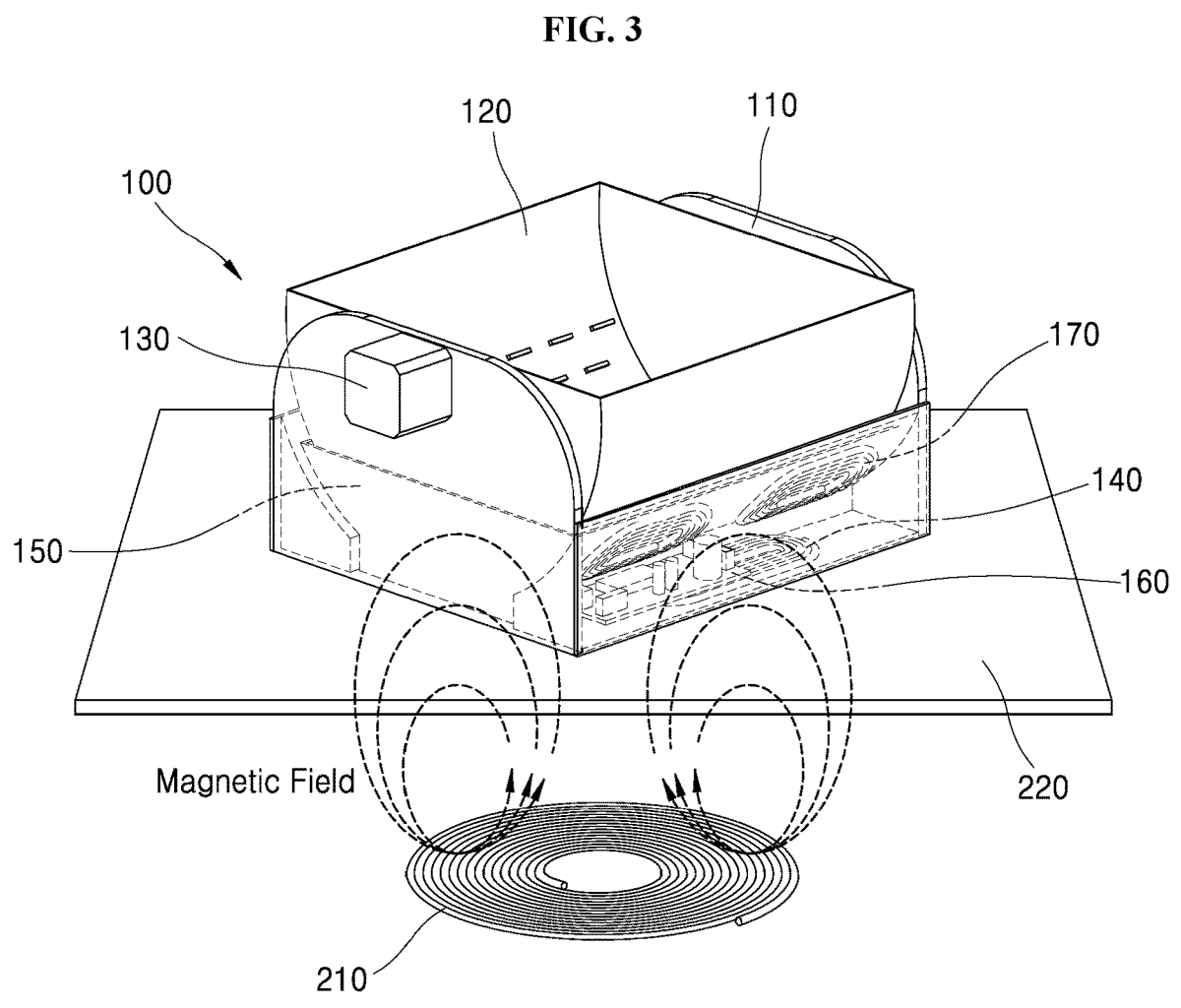
Figure 4:
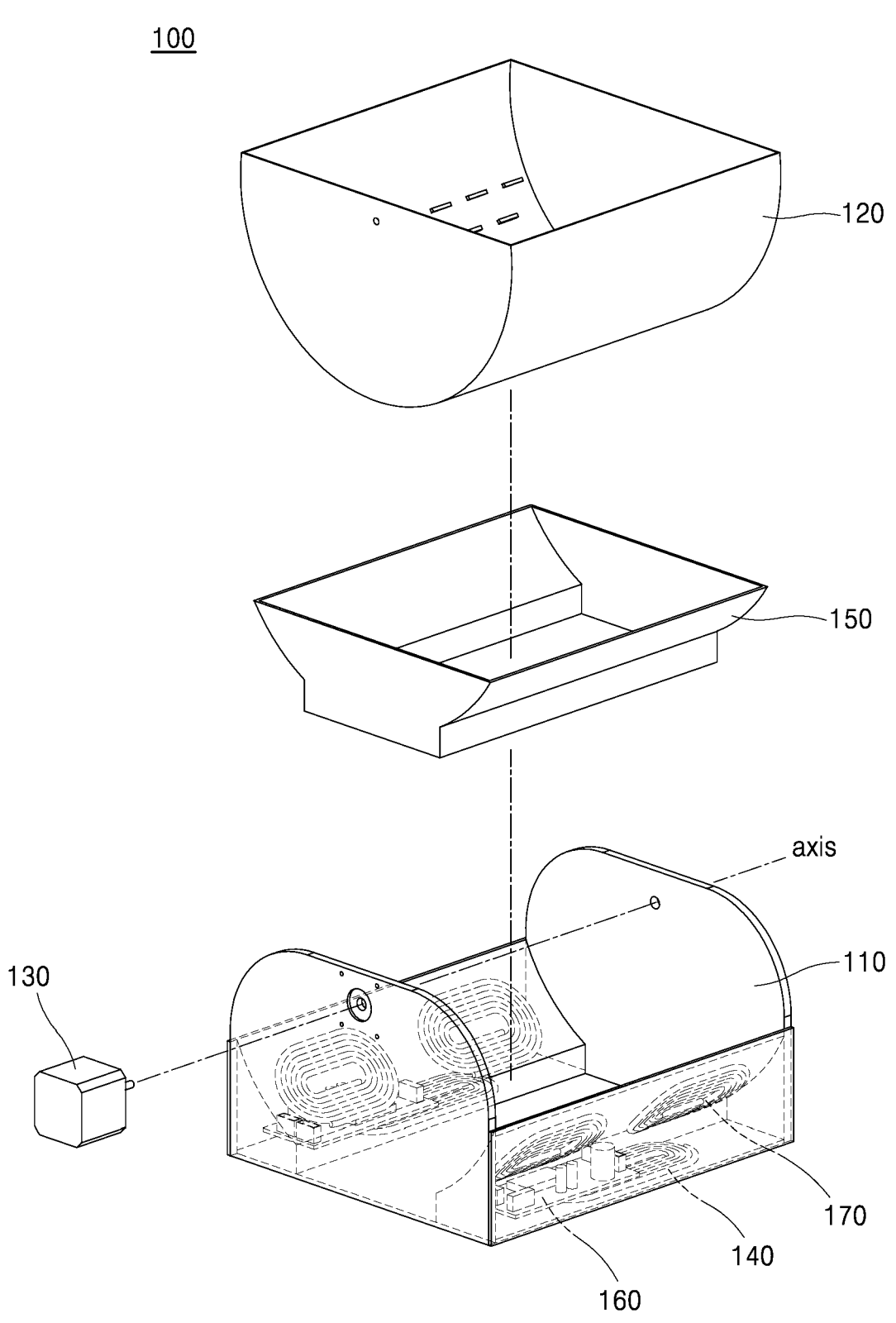
FIG. 4 is an exploded view of the rotary roaster shown in FIG. 3.

FIG. 3 is a view showing that a rotary roaster according to an embodiment of the present disclosure is placed on an induction heating device. FIG. 4 is an exploded view of the rotary roaster shown in FIG. 3.

Figure 5:
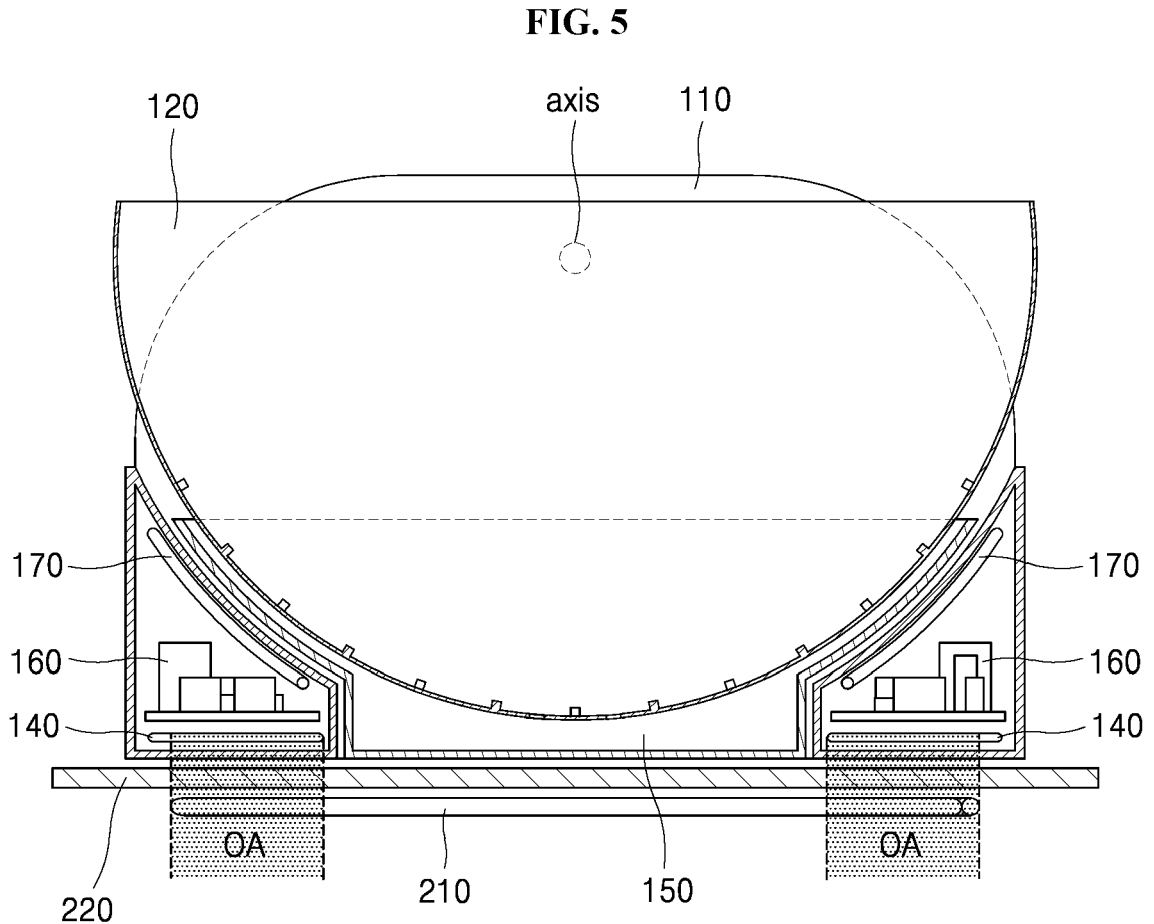
FIG. 5 is a lateral sectional view of the rotary roaster placed on a working coil.

FIG. 5 is a lateral sectional view of the rotary roaster placed on a working coil.

Figure 6:
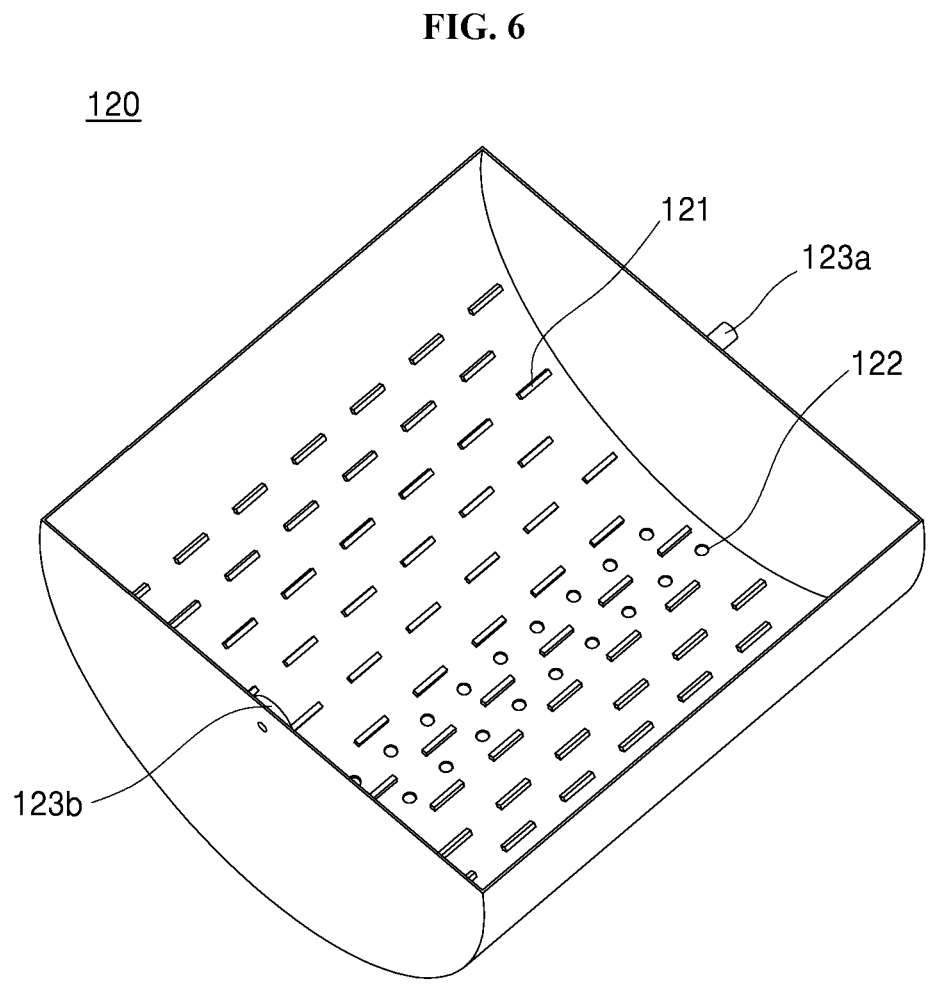
Figure 7:
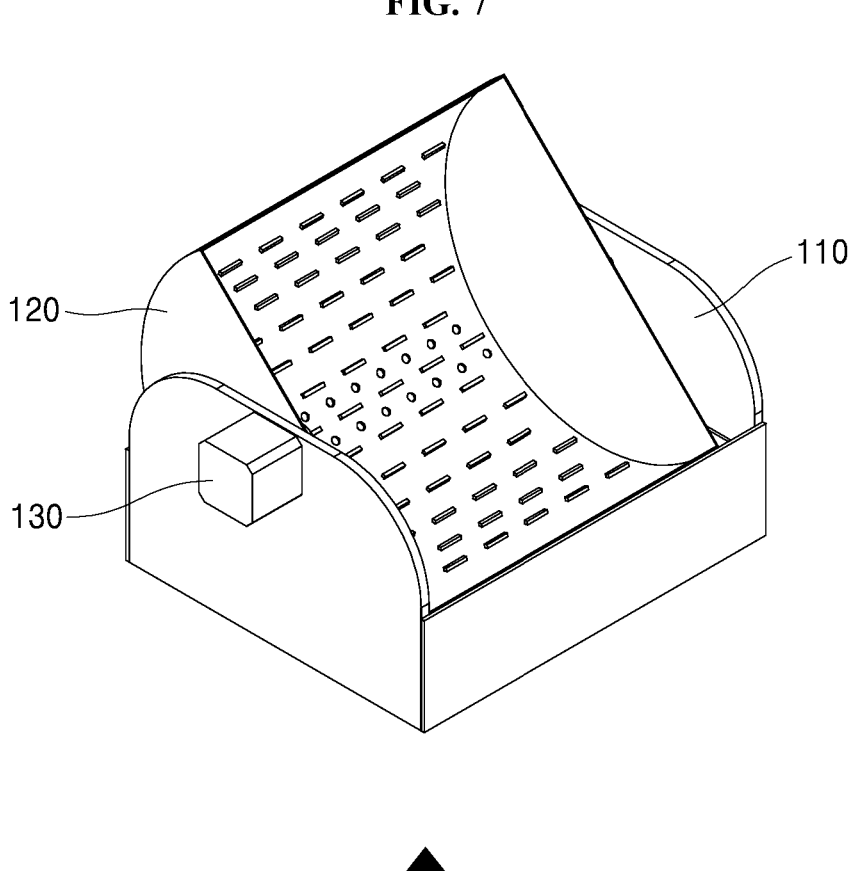
FIG. 7 is a view showing that the grill swings within a certain angular range by a motor.
Figure 7:
Figure 7:
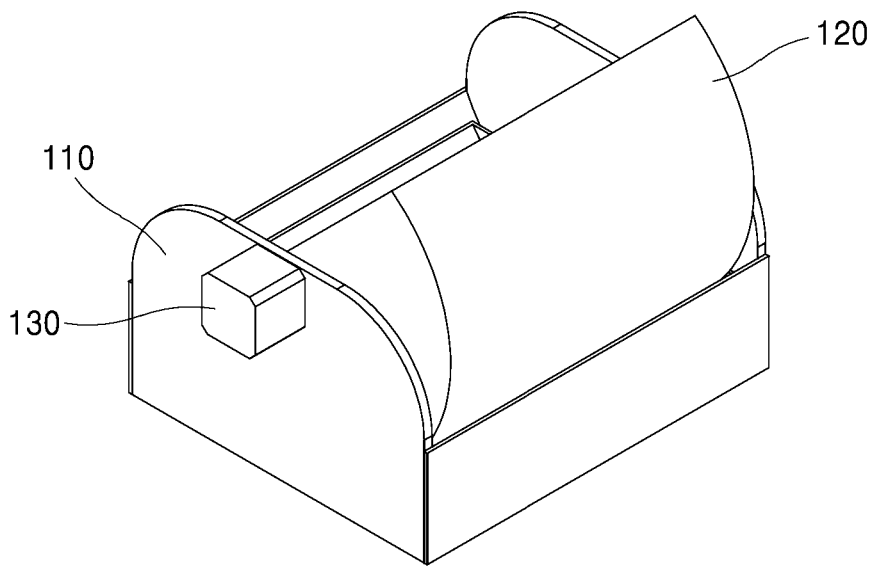

FIG. 6 is a view showing a grill according to an embodiment of the present disclosure. FIG. 7 is a view showing that the grill swings within a certain angular range by a motor.

Figure 8:
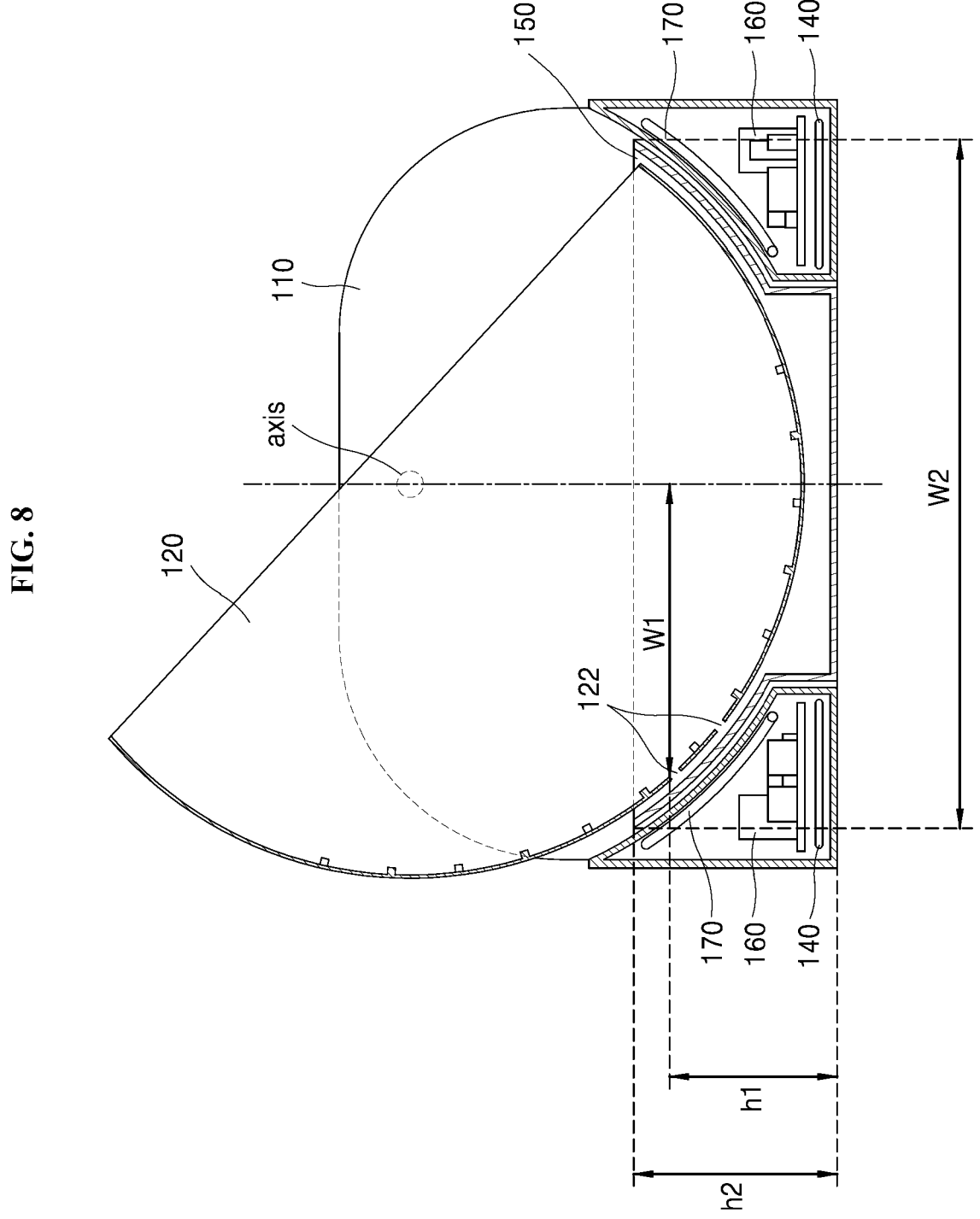
FIG. 8 is a view to describe a location relationship between an oil outlet hole and an oil dripping pan that are formed in the grill.

FIG. 8 is a view to describe a location relationship between an oil outlet hole and an oil dripping pan that are formed in the grill.

Figure 9:
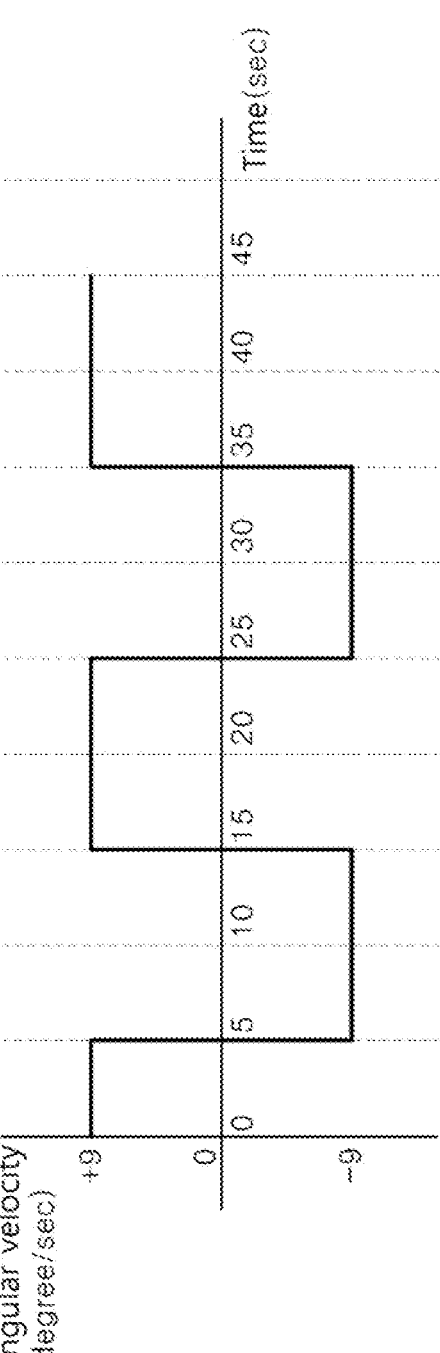
FIGS. 9 and 10 are graphs showing rotational angular velocities of the grill based on time.
Figure 10:
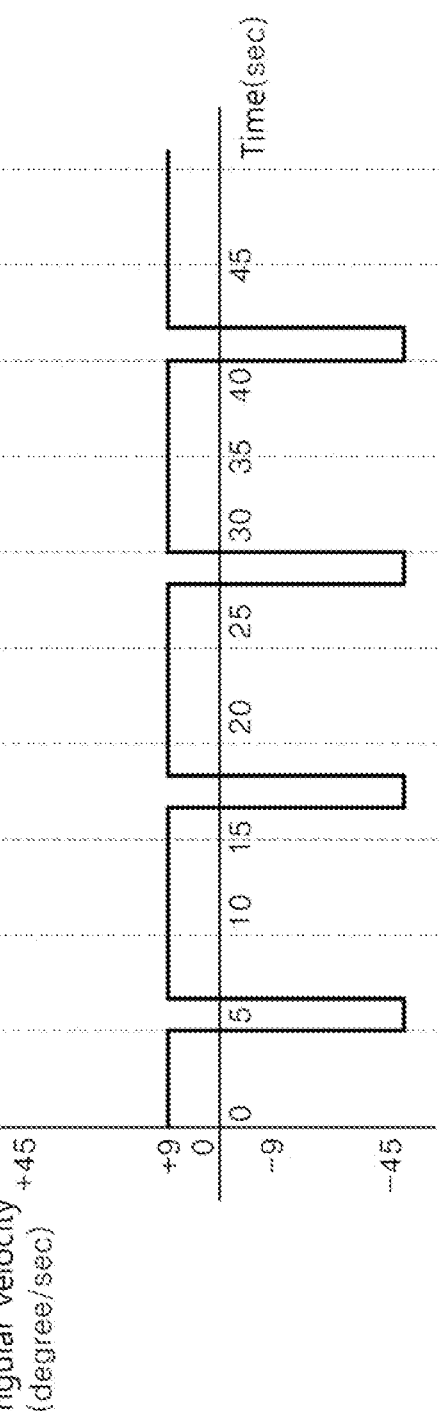
Figure 11:
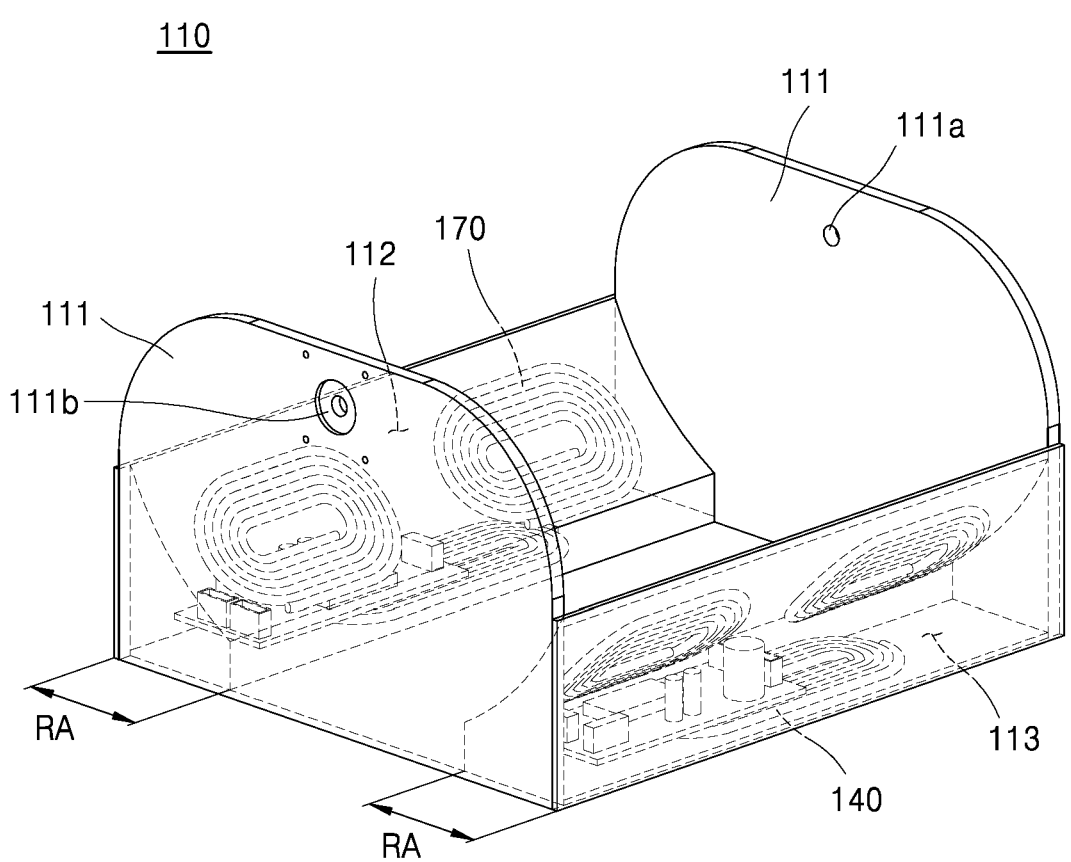
FIG. 11 is a view showing a supporter according to an embodiment of the present disclosure.
Figure 12:
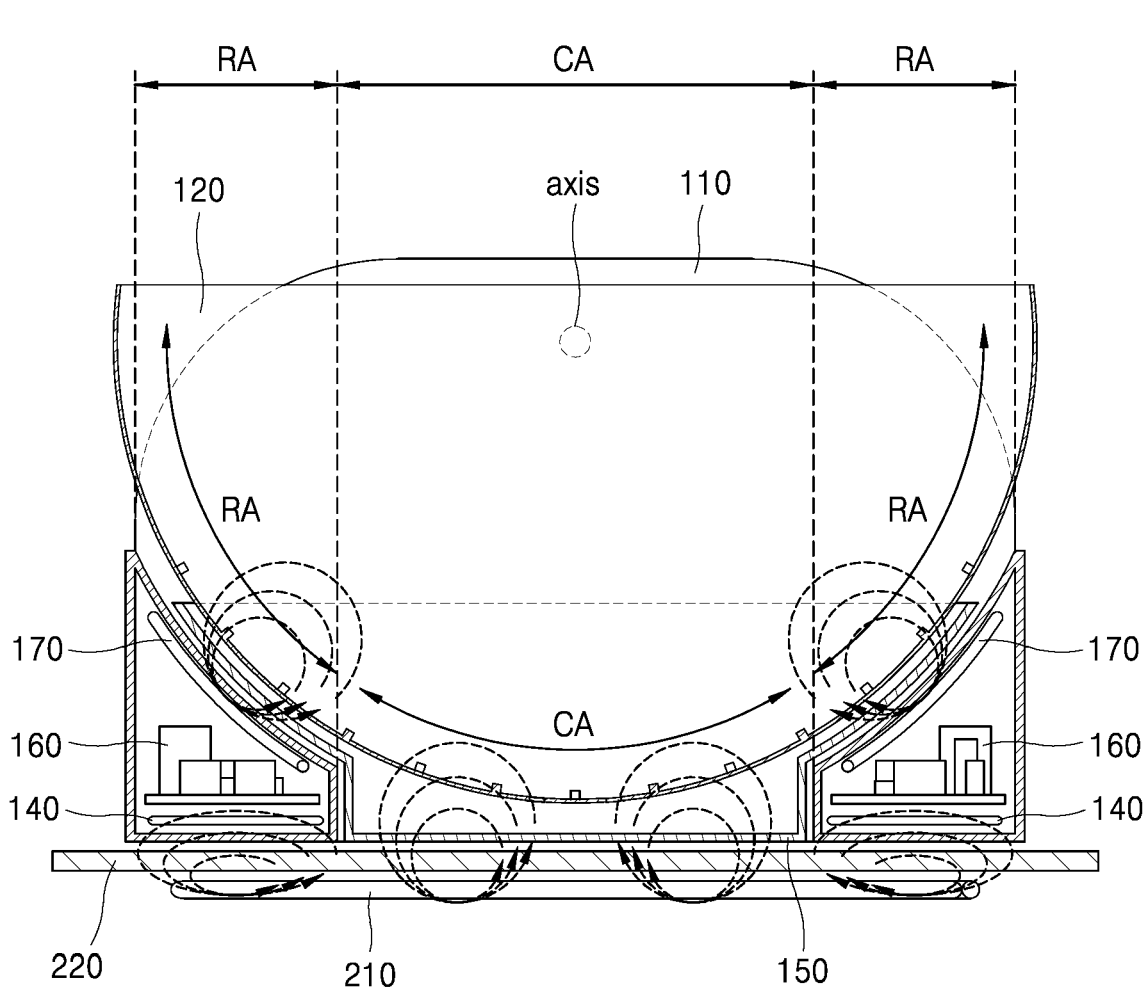
FIG. 12 is a view showing that the grill is heated by a working coil of the induction heating device and a lateral surface heating coil provided in the supporter.

FIGS. 9 and 10 are graphs showing rotational angular velocities of the grill based on time;

FIG. 11 is a view showing a supporter according to an embodiment of the present disclosure. FIG. 12 is a view showing that the grill is heated by a working coil of the induction heating device and a lateral surface heating coil provided in the supporter.

Figure 13:
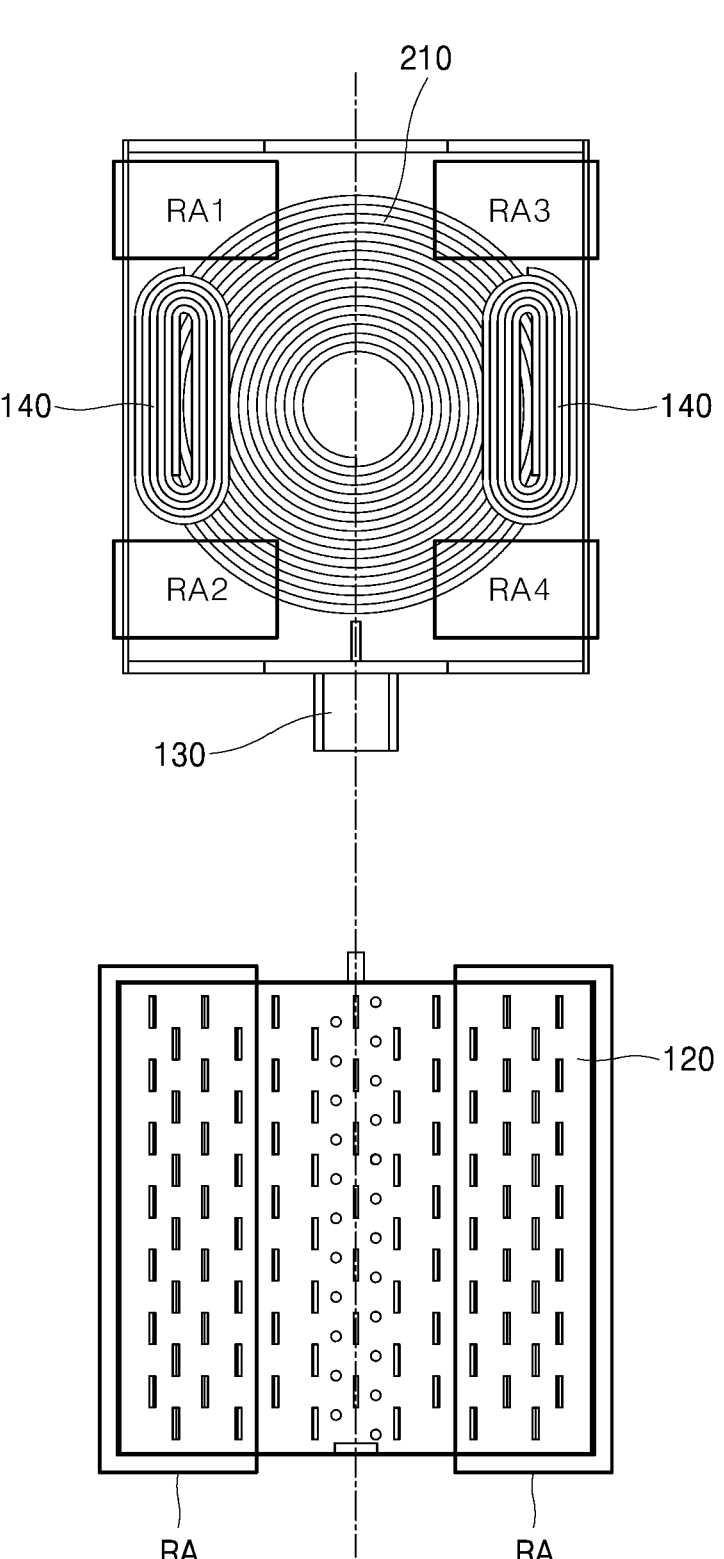
FIG. 13 is a view showing an insufficient heating region due to the relative arrangement of the working coil and the grill.
Figure 14:
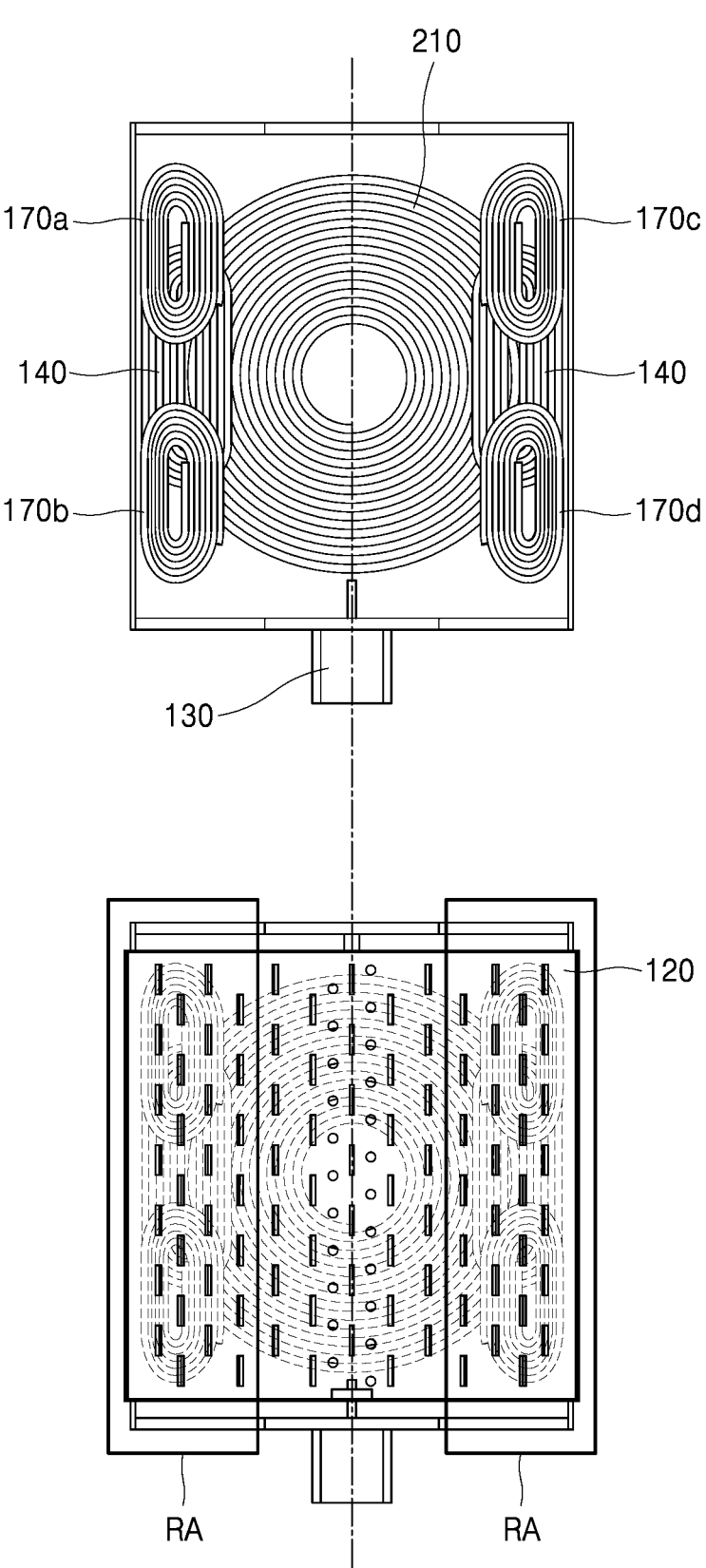
FIG. 14 is a view showing the lateral surface heating coil disposed in the insufficient heating region of FIG. 13.

FIG. 13 is a view showing an insufficient heating region due to the relative arrangement of the working coil and the grill and FIG. 14 is a view showing the lateral surface heating coil disposed in the insufficient heating region of FIG. 13.

Referring to FIG. 3, the rotary roaster 100 according to the embodiment may be operating on an induction heating device. In particular, the rotary roaster 100 may be placed on an upper plate 220 of any induction heating device including a working coil 210, and may operate in a state of being placed on a vertical line of the working coil 210.

A current may flow along the working coil 210 under the control of the induction heating device, so that a magnetic field may be generated in the working coil 210. The magnetic field generated in the working coil 210 may heat a grill constituting the rotary roaster 100.

That is, the grill 120 provided in the rotary roaster 100 and configured to receive food may be heated by an induction heating method. More specifically, when the rotary roaster 100 is placed on the induction heating device, a lower surface of the grill 120 may be disposed in opposite to the working coil 210. The magnetic field generated in the working coil 210 may induce a current to the grill 120 and the grill 120 may be heated by Joule's heat caused due to the induced current.

The grill 120 may be made of any magnetic material. For example, the grill 120 may be formed of case ion containing iron (Fe) or clad formed by bonding iron (Fe) and stainless steel. The structural features of the grill 120 will be described later.

Referring to FIGS. 4 and 5, the rotary roaster 100 according to an embodiment of the present disclosure may include a supporter 110, a grill 120, a motor 130, a receiving coil 140, an oil dripping pan 150, a power conversion unit 160, and a lateral surface heating coil 170. The rotary roaster 100 shown in FIGS. 4 and 5 is one embodiment of the present disclosure and the components of the rotary roaster are not limited to the embodiment shown in FIGS. 4 and 5. If necessary, some components may be added, changed or deleted.

The supporter 110 may be configured to support each of the components so that the rotary roaster 100 can be assembled as one body. Here, the term 'support' may collectively refer to all functions for fixing the position of components, such as mounting, coupling and fastening. Meanwhile, the receiving coil 140, the power conversion unit 160, and the lateral surface heating coil 170 may be embedded in the supporter 110, which will be described later.

The supporter 110 may be configured to support the grill 120, the oil dripping pan 150 for receiving the oil flowing from the grill 120 and the motor 130 for rotating the grill 120.

Referring to FIG. 4 as one example, the grill 120 may be rotatably coupled to the supporter 110. Specifically, the grill 120 may be coupled to both lateral walls 111 of the supporter 110 so as to rotate with respect to an imaginary axis penetrating both lateral walls 111 of the supporter 110.

The motor 130 may include a shaft and the shaft may be coupled to the grill 120. Accordingly, when the shaft is rotated by the motor 130, the grill coupled to the shaft may be also rotated.

Due to the above-described coupling relation, the grill 120 may swing at a preset angle on the working coil 210 of the induction heating device, and an outer surface of the grill 120 may be uniformly heated by the working coil 210.

In other words, the present disclosure may heat the food placed in the grill 120 while rotating the grill 120, thereby uniformly heating the food contained in a large area of the grill 120.

Referring to FIG. 6, the grill 120 may have a cylindrical shape, more specifically, a cylindrical shape having an open longitudinal cross-section. Coupling members 123a, 123b may be formed in upper and lower surfaces of the grill 120 to be coupled to both lateral walls 111 of the supporter 110, respectively. The shaft of the motor 130 may penetrate one lateral wall 111 of the supporter 110 to be coupled to one coupling member 123a formed in the grill 120.

Meanwhile, a plurality of oil outlet holes 122 may be formed in the grill 120. The plurality of oil outlet holes 122 may be formed at the center of a circumferential surface of the grill 120 to discharge oil even when the grill does not swing. At this time, the oil discharged through the oil outlet holes 122 may be received by the oil dripping pan 150.

As described above, the grill 120 may be configured to swing at a predetermined angle. Since the oil outlet holes 122 may be fixedly formed on the circumferential surface of the grill 120, the oil may be discharged in an angle range at which the oil outlet holes 122 moves during the swing movement of the grill 120.

Referring to FIG. 7 as one example, the grill 120 formed in the cylindrical shape having the open longitudinal cross-section may be configured to swing in a predetermined angle range by the motor 130. During the swing movement of the grill 120, coil may flow along a centrifugal direction in the grill or may be discharged through the oil outlet holes 122.

To receive all of the oil discharged during the swinging of the grill 120, the width of the oil dripping pan 150 may be wider than the width of a region in which the oil outlet holes move during the rotation of the grill 120.

FIG. 9 is a view showing that the grill 120 swings at the maximum angle in one direction. The oil outlet holes 122 may horizontally move as far as the maximum length (w1) with respect to the shaft. Accordingly, when the grill 120 swings at the maximum angle in both directions, the oil dripping fan 122 may be horizontally moved as twice as the maximum length w1 (2w1).

To receive the oil discharged from the oil outlet holes 122 while the grill 120 is swinging, the oil dripping pan 150 may be centered on the horizontal position of the shaft, and the width w2 may be wider than twice (2w1) the maximum length w1.

In addition, to receive all of the discharged oil in the predetermined angle range, the height of the oil dripping pan 150 may be greater than the height of the oil outlet holes 122 during the rotation of the grill 120.

Referring back to FIG. 8, when the grill 120 swings at the maximum angle, the oil outlet holes 122 may rise as high as the maximum height h1 with respect to a bottom surface 113. The height h2 of the oil dripping pan 150 may be formed higher than the maximum height h1, in order to receive the oil discharged through the oil outlet holes 122 rising by the maximum height.

As described above, all of the oil discharged from the grill 120 may be received in the present disclosure. Accordingly, the present disclosure may prevent the oil generated from the food from splashing to the outside, and may allow the user to easily dispose of the discharged oil.

Meanwhile, the above-described oil dripping pan 150 may be made of a non-magnetic material.

As described above, the oil dripping pan 150 may be disposed between the working coil 210 of the induction heating device and the grill 120. Accordingly, the oil dripping pan 150 may be positioned on a path of a magnetic field directed toward the grill 120.

When the oil dripping pan 150 is made of a magnetic material, the oil dripping pan 150 may be also heated by Joule's heat generated by the magnetic field and the amount of heat transferred to the grill that is a heating target may be reduced. In order to prevent such deterioration of induction heating efficiency for the grill, the oil dripping pan 150 may be made of a non-magnetic material (e.g., plastic).

Hereinafter, the mounting structure and function of the motor 130 will be described in detail.

As described above, the motor 130 may be configured to rotate the grill 120. To this end, the motor 130 may be fixedly mounted in the supporter 110 and coupled to the grill 120.

Referring to FIGS. 4, 6 and 11, the grill 120 may be coupled to support members 111*a* and 111*b* formed in both lateral walls 111 of the supporter 110. Here, each of the support members 111*a* and 111*b* may include a support hole 111*a* and a support protrusion 111*b*, for example.

More specifically, one coupling members 123*a* of the grill 120 may penetrate the support hole 111*a* formed in one lateral wall 111 of the supporter 110. The other coupling member 123*b* of the grill 120 may be coupled to the support protrusion 111*b* formed in the other lateral wall of the supporter 110, thereby coupling the grill 120 and the supporter 110.

In this instance, the motor 130 may rotate the grill 120 by means of the shaft inserted in the support member formed in one lateral wall 111 of the supporter 110.

To this end, the motor 130 may be coupled to an outer surface of one lateral wall 111. As one example, as shown in FIG. 4, the motor 130 may be coupled to the supporter 110 so that the shaft of the motor may be fixedly mounted to the grill 120 through the hole formed in the support protrusion 111*b*. Accordingly, the motor 130 may rotate the shaft to swing the grill 120.

When the grill 120 swings, the food placed in the grill 120 may move along the centrifugal force and the gravity. A plurality of locking protrusions 121 may be formed on an inner circumferential surface of the grill 120 to turn over or mix the food easily.

Referring back to FIG. 6 the locking protrusions 121 extended a predetermined length in the longitudinal direction of the grill 120 may be disposed on the inner circumferential surface of the grill 120 in accordance with rows. Since the locking protrusions 121 are extended in the longitudinal direction, the food moving along the inner circumferential surface of the grill 120 in a horizontal direction when the grill 120 swings may be locked by the locking protrusions, to be overturned or mixed Some of the locking protrusions disposed in adjacent rows may be alternately shifted from each other. Accordingly, when the grill 120 swings, the food horizontally moving along the inner circumferential surface of the grill 120 may be locked to longitudinally move, so that the food can be uniformly mixed.

Meanwhile, the motor 130 may rotate the grill in a clockwise direction or a counter-clockwise direction, and the rotation number in the clockwise direction may be controlled to be equal to or different from the rotation speed in the counter-clockwise direction.

As one example, referring to FIG. 9, the motor 130 may sequentially rotate the grill 120 in the clockwise direction and the counter clockwise direction at intervals of 10 seconds, and the angular velocity in the clockwise direction and the angular velocity in the counter-clockwise direction may be controlled to be equal to each other (e.g., 9 [degree/sec]).

Accordingly, the grill 120 may swing at a constant speed. Such control may be used when the volume of the food in the grill 120 is large or the appearance of the food is easily damaged by excessive movement of the food.

Alternatively, referring to FIG. 10, the motor 130 may repeat the operation of rotating the grill 120 in the clockwise direction for 10 seconds and then rotating the grill 120 in the counter clockwise direction for 1.67 seconds. At this time, the motor 130 may control the angular velocity in the clockwise direction to be different from the angular velocity in the counter-clockwise direction. As one example, the motor 130 may control the angular velocity in the clockwise direction to be 9 [degree/sec] and the angular velocity in the counter-clockwise direction to be 45 [degree/sec].

Through this control, the rotation direction of the grill 120 may be quickly switched from one direction (e.g., the clockwise direction) to the other (e.g., the counter-clockwise direction), so that the food in the grill may be mixed as a whole. This control may be used, in case the outer surface of the food has to be heated uniformly as a whole without deformation of the appearance of the food even if the volume of the food placed in the grill 120 is small or the food is excessively moved.

As described above, the present disclosure may prevent a specific portion of the food from being overheated or undercooked by turning over or mixing the food.

The control of the motor 130 described above may be executed by a user's command. Although not shown in the drawing, the motor 130 may further include a manipulation member for receiving input of the user's command.

For the operation of the motor 130, it is necessary to supply power to the motor 130. As described referring to FIG. 3, the conventional rotary roaster 100 should be wired to a separate commercial power supply or include an embedded battery. However, such a method could deteriorate portability and ease of use.

To overcome the limitation of the prior art, the rotary roaster according to an embodiment of the present disclosure may include a receiving coil 140 provided on a bottom surface 113 of the supporter 110 and configured to supply the power induced by the working coil 210 of the induction heating device to the motor 130.

Referring back to FIG. 5, the receiving coil 140 may be disposed on the bottom surface 113 of the supporter 110 to face the working coil 210. As a current flows in the working coil 210, a magnetic field generated in the working coil 210 may link in the receiving coil, and accordingly, a current may be induced in the receiving coil 140.

To link the magnetic field in the receiving coil, the receiving coil 140 may be perpendicularly overlapped with the working coil 210. In other words, a certain or the entire area of the receiving coil 140 may be perpendicularly overlapped with the working coil 210. For example, as shown in FIG. 5, the receiving coil 140 and the working coil 210 may be disposed to form an overlapped region with a predetermined width.

However, to prevent deterioration of induction heating efficiency for the grill 120, the receiving coil 140 may be disposed in an edge area RA of the supporter.

Referring to FIG. 11, a support surface 112 facing the outer circumferential surface of the grill 120 and a bottom surface 113 facing the working coil 210 may be formed in both edge regions RA of the supporter 110. The receiving coil 140 may be provided the bottom surface 113 of each of both edge regions RA. The width of the edge region RA may be determined according to design needs.

Referring to FIG. 12, some region between the two edge regions RA may be defined as the center region CA. The distance between the grill 120 disposed in the edge area RA and the working coil 210 is greater than the distance between the grill 120 disposed in the center area CA and the working coil 210. Accordingly, the amount of heat transferred by the magnetic field generated in the working coil 210 may be relatively lower in the edge region RA than in the center region CA.

Since the receiving coil 140 may be disposed on the bottom surface 113 in the edge region RA having the relatively low heat transfer amount, the total amount of heat transfer to the grill 120 may not be significantly reduced.

The receiving coil 140 may supply the current induced by the magnetic field generated in the working coil 210 to the motor 130. At this time, to enhance current supply stability, the rotary roaster 100 according to the embodiment of the present disclosure may include a power conversion unit 160 configured to convert the current induced in the receiving coil 140 into a driving voltage and to provide the converted voltage to the motor 130.

Referring to FIGS. 11 and 12, the power conversion unit 160 may be embedded in the supporter 110 in the form of an integrated circuit package. As one example, the power conversion unit 160 may be embedded in a space defined between the support surface 112 and the bottom surface 113 of the supporter 110.

An input end of the power conversion unit 160 may be connected to the receiving coil 140, and an output end of the power conversion unit 160 may be connected to the motor 130. Accordingly, the power conversion unit 160 may convert the current induced in the receiving coil 140 into a stable DC or AC voltage and provide the voltage to the motor 130. To this end, the power conversion unit 160 may include a rectifier circuit, a converter, a DC link capacitor, an inverter, and a plurality of passive elements.

The motor 130 may operate by the electric power supplied from the receiving coil 140. In other words, the power required for the motor 130 to swing the grill 120 may not be supplied from an external power source or battery, but may be supplied from the receiving coil 140 supplied from the working coil 210.

As described above, the present disclosure may not require a separate electric power for rotating the grill 120, thereby improving portability and use convenience of the rotary roaster 100.

Meanwhile, as described before, the amount of heat supplied to the grill 120 from the edge region RA of the supporter 110 may be less than the amount of heat supplied to the grill 120 from the center region CA. accordingly, even when the grill 120 swings, heating uniformity for the food placed in the grill 120 could be lowered.

To prevent the deterioration of heat uniformity, the rotary roaster according to the embodiment may include the lateral surface heating coil 170 provided in each inner surface of support surfaces 112 provided in the supporter 110.

Referring to FIGS. 11 and 12, the support surface 112 facing the outer circumferential surface of the grill 120 may be formed in the edge region RA. For example, when the outer surface of the grill 120 is a circumferential surface, the support surface 112 may be also a circumferential surface. At this time, the lateral surface heating coil 170 configured to heat the grill 120 disposed in the edge area RA may be disposed on an inner surface of the support surface 112 to face the outer circumferential surface of the grill 120.

In the embodiment, the lateral surface heating coils 170 may be connected to the receiving coil 140 described above. In other words, the lateral surface heating coil 170 and the receiving coil 140 may be formed of a single conductive wire. Accordingly, when a current is induced to the receiving coil 140 by the working coil 210, the induced current may flow to the lateral surface heating coil 170. Then, the current may flow in the lateral surface heating coil 170 and the magnetic field may be generated in the lateral surface heating coil 170. The magnetic field generated in the surface heating coil 170 may induce a current to the grill placed in the edge region RA.

As one specific example referring to FIGS. 11 and 12, the receiving coil 140 may include a first receiving coil and a second receiving coil that are provided in one area and the other area of the edge region RA, respectively. At this time, the lateral surface heating coil 170 may include two first lateral surface heating coil 170 respectively disposed on the support surfaces 112 provided in one area of the edge area RA to be connected to the first receiving coil, and two second lateral surface heating coils 170 respectively disposed on the support surfaces 112 provided in the other area of the edge area RA to be connected to the second receiving coil 140.

In this structure, a current may be induced in the first receiving coil 140 by the working coil 210 and the corresponding coil may flow in the two first lateral surface heating coils 170 as well. Also, a current may be induced in the second receiving coil 140 by the working coil 210 and then the corresponding current may flow in the second lateral surface heating coil 170 as well. When the currents flow in the first and second lateral surface heating coils 170, magnetic fields may be generated in the first and second lateral surface heating coils 170 and the magnetic fields generated in the first and second lateral surface heating coils 170 may induce currents in the grills 120 disposed in both areas of the edge region RA.

When the currents area induced in the grills 120 disposed in the edge region RA, the grills 120 disposed in the edge regions RA may be heated by Joule's heat occurring due to the induced current.

As another example, the power conversion unit 160 described above may convert the current induced in the receiving coil 140 into a high-frequency current and provide it to the lateral surface heating coil 170.

An input end of the power conversion unit 160 may be connected to the receiving coil 140 and an output end thereof may be connected to the lateral surface heating coil 170. Accordingly, the power conversion unit 160 may convert the current induced in the receiving coil 140 into a stable high-frequency current (i.e., AC current) and provide the high-frequency current to the lateral surface heating coil 170. To this end, the power conversion unit 160 may include various circuits and circuit elements as mentioned above.

Meanwhile, to improve heating uniformity for the grill 120, the lateral surface heating coil 170 may be disposed to vertically overlap an area in which the working coil 210 and the grill 120 do not vertically overlap.

FIGS. 13 and 14 are views showing that the working coil 210 and the grill 120 vertically overlapping are separated. As shown in FIG. 13, when the working coil 210 is a circular flat coil and a longitudinal cross-section of the grill 120 is rectangular, vertex areas RA1, RA2, RA3, and RA 4 of the grill 120 among the edge regions RA may not vertically overlap with the working coil 210.

In this structure, the amount of heat transferred to the vertex area RA1, RA2, RA3 and RA4 may be reduced. To prevent such reduction of heat transfer amount, the lateral surface heating coil 170*a,* 170*b,* 170*c* and 170*d* shown in FIG. 14 may be arranged to vertically overlap with some or all of the area in which the working coil 210 and the grills 120 do not overlap (e.g., the vertex areas RA1, RA2, RA3 and RA4).

As described above, the rotary roaster according to the present disclosure may heat even the lateral surface of the grill 120 through the induction heating, thereby uniformly heating the food regardless of the food position in the grill 120. Specifically, in the present disclosure, the lateral surfaces or vertex areas of the grill having the relatively small amount of heat transfer may be heated by using the induction heating method, thereby uniformly and evenly heating the food regardless of the food position in the grills 120.

The embodiments are described above with reference to a number of illustrative embodiments thereof. However, the present disclosure is not intended to limit the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

The invention claimed is:

1. A rotary roaster configured to operate on an induction heating device comprising:
    a supporter;
    a grill rotatably coupled to the supporter;
    a motor configured to rotate the grill;
    a receiving coil provided on a bottom surface of the supporter and configured to provide a power induced by a working coil of the induction heating device to the motor; and
    a lateral surface heating coil,
    wherein a support surface facing an outer circumferential surface of the grill and a bottom surface facing the working coil are formed in each of both edge areas provided in the supporter,
    wherein the receiving coil comprises a first receiving coil provided in a first edge area and a second receiving coil provided in a second edge area, and
    wherein the lateral surface heating coil comprises:
        a plurality of first lateral surface heating coils disposed on a support surface of the first edge area and connected to the first receiving coil; and a plurality of second lateral surface heating coils disposed on a support surface of the second edge area and connected to the second receiving coil.

2. The rotary roaster of claim 1, wherein a plurality of oil outlet holes are formed in the grill, and
    wherein an oil dripping pan configured to receive oil discharged through the plurality of oil outlet holes is mounted to the supporter.

3. The rotary roaster of claim 2, wherein a width of the oil dripping pan is greater than a width of an area in which the plurality of oil outlet holes move when the grill is rotated.

4. The rotary roaster of claim 2, wherein a height of the oil dripping pan is greater than a height formed by the plurality of oil outlet holes when the grill is rotated.

5. The rotary roaster of claim 2, wherein the oil dripping pan is made of a non- magnetic material.

6. The rotary roaster of claim 1, wherein the grill is coupled to each of support members formed in both lateral walls of the supporter, and
    wherein the motor is configured to rotate the grill through a shaft inserted in a support member formed in one lateral wall of the supporter.

7. The rotary roaster of claim 1, wherein the grill has a cylindrical shape, and
    wherein a plurality of locking protrusions are formed in an inner circumferential surface of the grill.

8. The rotary roaster of claim 1, wherein the motor rotates the grill in a clockwise direction or a counter-clockwise direction, and controls a clockwise rotation speed and a counter-clockwise rotation speed to be different from each other.

9. The rotary roaster of claim 1, further comprising a power conversion unit configured to convert a current induced in the receiving coil into a driving voltage and provide the driving voltage to the motor.

10. The rotary roaster of claim 9, wherein the receiving coil vertically overlaps with the working coil.

11. The rotary roaster of claim 1, wherein the lateral surface heating coil is disposed to vertically overlap with an area in which the working coil and the grill do not vertically overlap.

12. The rotary roaster of claim 1, further comprising a power conversion unit configured to convert a current induced in the receiving coil into a high- frequency current and provide the converted high-frequency current to the lateral surface heating coil.

* * * * *